United States Patent
Zhu et al.

(10) Patent No.: US 11,323,192 B2
(45) Date of Patent: May 3, 2022

(54) ADAPTIVE MODULATION METHOD FOR BAYES CLASSIFIER-BASED ENERGY HARVESTING RELAY SYSTEM

(71) Applicant: NANJING UNIVERSITY OF POSTS AND TELECOMMUNICATIONS, Nanjing (CN)

(72) Inventors: Qi Zhu, Nanjing (CN); Kang Liu, Nanjing (CN); Hongbo Zhu, Nanjing (CN); Longxiang Yang, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 0 days.

(21) Appl. No.: 17/266,428

(22) PCT Filed: Jul. 4, 2019

(86) PCT No.: PCT/CN2019/094701
§ 371 (c)(1),
(2) Date: Feb. 5, 2021

(87) PCT Pub. No.: WO2020/181695
PCT Pub. Date: Sep. 17, 2020

(65) Prior Publication Data
US 2021/0399815 A1 Dec. 23, 2021

(30) Foreign Application Priority Data
Mar. 12, 2019 (CN) .......................... 201910183808.0

(51) Int. Cl.
*H04B 17/391* (2015.01)
*H04B 17/373* (2015.01)
*G06K 9/62* (2022.01)

(52) U.S. Cl.
CPC ......... *H04B 17/391* (2015.01); *G06K 9/6278* (2013.01); *H04B 17/373* (2015.01)

(58) Field of Classification Search
CPC .. H04B 17/373; H04B 17/391; G06K 9/6278; G06N 7/005; Y02D 30/70
See application file for complete search history.

(56) References Cited

U.S. PATENT DOCUMENTS

2005/0157639 A1* 7/2005 Song ..................... H04L 1/0003
370/208
2008/0254760 A1* 10/2008 Wu ..................... H04W 52/262
455/343.1
(Continued)

FOREIGN PATENT DOCUMENTS

| CN | 108551383 A | 9/2018 |
| CN | 109286426 A | 1/2019 |
| CN | 109951239 A | 6/2019 |

OTHER PUBLICATIONS

An Online Adaptive Modulation Scheme for Energy Harvesting Nodes Using Bayesian Decision Theory K Liu, Q Zhu, H Hu—2018 IEEE 18th International Conference . . . , 2018—ieeexplore.ieee.org (Year: 2018).*
(Continued)

*Primary Examiner* — Un C Cho
*Assistant Examiner* — Rasha K Fayed
(74) *Attorney, Agent, or Firm* — Andrus Intellectual Property Law, LLP (57) ABSTRACT

The present disclosure provides an adaptive modulation method for a naive Bayes classifier-based energy harvesting relay system. First, a sending end determines its modulation mode based on a status of a data buffer of a relay, so that sent data does not exceed a storage capability of the relay. Then, based on data sent by the sending end, and channel status information and energy harvesting status information within
(Continued)

a period of time, the relay determines an optimal modulation mode used by the relay within the period of time. After that, the modulation mode, the channel status information, and the energy harvesting status information are used as training data to obtain a classification model based on a naive Bayes classifier algorithm. In this way, the relay can adaptively select a modulation mode when only knowing of channel information and energy information in a current timeslot.

3 Claims, 3 Drawing Sheets

(56) References Cited

U.S. PATENT DOCUMENTS

| | | | |
|---|---|---|---|
| 2016/0219506 A1* | 7/2016 | Pratt | H04L 5/0051 |
| 2018/0034580 A1* | 2/2018 | Rost | H04L 1/0003 |
| 2019/0141571 A1* | 5/2019 | Kim | H04W 28/0236 |

OTHER PUBLICATIONS

Energy harvesting with cooperative networks and adaptive transmission A Andrawes, R Nordin, M Ismail—2017 IEEE Jordan . . . , 2017—ieeexplore.ieee.org (Year: 2017).*

Jointing Adaptive Modulation Relay Selection Protocols for Two-Way Opportunistic Relaying Systems with Amplify-and-Forward Policy Hui Zhi • Longxiang Yang • Hongbo Zhu; Published online: Dec. 24, 2012 (Year: 2012).*

Chikha, W.B., "On the Performance Evaluation of Bayesian Network Classifiers in Modulation Identification for Cooperative MIMO Systems", 2015 23rd International Conference on Software, Telecommunications and Computer Networks (SoftCOM), presented Nov. 2, 2015.

International Search Report for PCT/CN2019/094701, dated Dec. 4, 2019.

* cited by examiner

ADAPTIVE MODULATION METHOD FOR BAYES CLASSIFIER-BASED ENERGY HARVESTING RELAY SYSTEM

TECHNICAL FIELD

The present disclosure relates to the technical field of communications, and specifically, to an adaptive modulation method for a naive Bayes classifier-based energy harvesting relay system.

BACKGROUND

In recent years, with the development of wireless communications technologies, wireless businesses are more widely applied, and more energy resources are consumed. Therefore, green communication attracts wide attention. In an energy harvesting technology, a node harvests energy from a surrounding environment, and uses the energy as sending power to send information of the node. Therefore, the energy harvesting technology is not only environmentally friendly, but also extends a service life of an energy self-sufficient device. In addition, with the expansion of a communication range, communication quality of an edge user decreases due to an increase of channel fading. In a cooperative relay technology, a relay node is added between a sending end and a receiving end to improve signal quality. This effectively improves network coverage, avoids the decrease of the communication quality due to the increase of channel fading, and can provide a specific communication gain. An energy harvesting relay has become an important research direction in next-generation mobile communications.

Lots of research has been carried out for power allocation in an energy harvesting system. However, for an actual communications system, a specific modulation mode usually needs to be considered. In a digital communications system, multiple quadrature amplitude modulation (MQAM) is one of most frequently used modulation technologies. For an energy harvesting relay system, there will be two main challenges for a node in the system to select a modulation mode. First, the system includes a source node and a relay, and both the source node and the relay need to send data. Therefore, how they determine their modulation modes will directly determine a throughput that the system can provide. The relay uses the energy harvesting technology, and has limited available sending power. As a result, the modulation mode of the relay is limited by harvested energy. However, the modulation mode of the source node mainly depends on an amount of traffic allowed by the system. Therefore, modulation orders of the source node and the relay need to be determined based on different limitation conditions. Second, the relay is allowed to store energy. Therefore, the relay can choose, based on a change of a channel status, whether to store the energy. When the channel status gets better, a higher-order modulation mode can be used to realize a larger system throughput. However, for the actual communications system, small-scale fading exists, and it is difficult for the node to predict a channel status in a future timeslot. This makes it difficult to determine in advance whether to store the energy, and as a result, it is difficult to increase the system throughput. Therefore, at represent, an algorithm for using a proper modulation mode to increase the system throughput in the case of lack of channel information is urgently needed.

SUMMARY

To overcome disadvantages in the prior art, the present disclosure provides an adaptive modulation method for a naive Bayes classifier-based energy harvesting relay system. According to the method, a scheme for determining a modulation mode of a node based on a naive Bayes classifier algorithm is constructed to resolve a problem that the node can only obtain channel information in a current timeslot and cannot predict a future channel status in an actual scenario, thereby effectively increasing a system throughput.

To achieve the foregoing objective, the present disclosure provides an adaptive modulation method for a naive Bayes classifier-based energy harvesting relay system. The method includes the following steps:

S1: determining, based on a status of a data buffer of an energy harvesting relay, a modulation mode used by a sending end, including determining a modulation mode $M_t^s$ of the sending end in a timeslot t according to $$M_t^s \leq 2^{\frac{(Q_{max}-Q_{t-1})\tau_s}{\tau}},$$

where $Q_{MAX}$ is a maximum storage capacity of a relay buffer, a system includes the sending end S, a receiving end D, and the energy harvesting relay R, the relay contains the data buffer and an energy buffer, and a storage capacity of the data buffer in a timeslot t−1 is $Q_{t-1}$;

S2: determining a modulation mode of the relay based on a probability distribution matrix, including obtaining a corresponding normalized channel gain $$k_t = \frac{h_t^{rd} - \overline{h_{rd}}}{\overline{h_{rd}}}$$

based on a gain $h_t^{rd}$ of a channel from the relay to a destination node in the timeslot t, where $\overline{h_{rd}}$ represents an average gain of the channel from the relay to the destination node; discretizing the channel based on a value of $k_t$ to obtain a discretized channel status $h^d$; obtaining a discretized energy storage status $$E^d = \left\lfloor 1 + \frac{1.5 h_{rd} E_t^r}{\ln\left(\frac{1}{5BER}\right) N_0 W \tau} \right\rfloor_M$$

based on an energy storage status $E_t^r$ in the timeslot t; calculating condition probabilities $P(h^d/M^r)$ and $P(E^d/M^r)$ for each modulation order based on the probability distribution matrix, and obtaining a posterior probability $$P(M^r/h^d \times E^d) = \frac{P(h^d/M^r)P(E^d/M^r)P(M^r)}{P(h^d \times E^d)};$$

and comparing, by the relay, posterior probabilities of different modulation orders, and selecting a modulation order with a maximum posterior probability as a modulation mode $M_t^r$ in the current timeslot; and S3: determining a sending power of the relay, including determining the sending power $$P_t^{min}(M_t^r) = \frac{(M_t^r - 1)\ln\left(\frac{1}{5BER}\right)N_0 W}{1.5 h_{rd}}$$

of the relay based on the modulation order, where BER represents a bit error rate requirement of the receiving end, $M_t^r$ represents the modulation order of the modulation mode used by the relay, $N_0$ represents noise power, W represents received signal bandwidth, and $h_{rd}$ represents a status of a channel from the relay to a source node; calculating remaining energy $B_t$ of the relay according to $B_t = E_t - P_t^{min}(M_t^r)$; and if $B_t < 0$, modifying the modulation order to satisfy $M_t^r = M_{t\ max}^r$, where $M_{t\ max}^r$ represents a maximum modulation order that can be selected in the current timeslot.

Further, the determining of the probability distribution matrix in step S2 includes the following steps:

S2-1: determining, by the relay in the timeslot r based on harvested energy, the adoptable maximum modulation order $$M_{t\ max}^r = \left\lfloor 1 + \frac{1.5 h_{rd} B_t}{\ln\left(\frac{1}{5BER}\right)N_0 W \tau} \right\rfloor_M$$

where $\lfloor x \rfloor_M$ represents selecting a maximum element not greater than x from a set M={1, 4, 16, 64, 256}; and calculating a total system throughput $$V = \sum_{t=1}^{T} \frac{\tau}{\tau_s} \log_2 M_{t\ max}^r$$

based on $M_t^r$, where T represents a total time length;

S2-2: determining the sending power $P_t^{min}(M_{t\ max}^r)$ of the relay based on the modulation order, and determining the remaining energy $B_t$ of the relay;

S2-3: adjusting the modulation mode in the timeslot t;

S2-4: repeating the preceding steps till a proper modulation mode is selected for the relay in each timeslot within T; and S2-5: obtaining the probability distribution matrix based on a naive Bayes classifier algorithm and the modulation order used by the relay, discretizing channel status information and energy storage status information that correspond to a timeslot in training data, taking statistics on different channel statuses and energy statuses under a same modulation mode, calculating the condition probabilities $P(h^d/M^r)$ and $P(E^d/M^r)$ respectively corresponding to the channel status and the energy status, obtaining the posterior probability $P(M^r/h^d \times E^d)$ according to a Bayes formula, and taking statistics on posterior probabilities of all modulation orders to obtain a finial probability distribution matrix.

Further, the adjusting the modulation mode in the timeslot r in step S2-3 specifically includes the following steps:

A) randomly selecting $M_t^{r'}$ to satisfy $M_t^{r'} < M_t^r$, and calculating new sending power $P_t^{min}(M_t^{r'})$ of the relay to obtain new storage energy $B_{t_0+1}$;

B) obtaining, based on a new storage energy status by using the method in step A), a maximum modulation order $M_{t_1}^{r'}$ that can be used by the relay in a timeslot $t_1$ that satisfies $t_1 > t$;

C) determining a new total system throughput V' based on the new modulation order $M_{t_1}^{r'}$; and if V'>V, updating a modulation order in a timeslot t to satisfy $M_{t_0}^r = M_{t_0}^{r'}$; otherwise, keeping the modulation order unchanged; and D) repeating the step A) to the step C) till all selectable modulation orders in the timeslot $t_1$ are selected.

In the present disclosure, when future channel information is unknown, an online adaptive modulation method for an energy harvesting relay is provided based on the naive Bayes classifier algorithm in machine learning algorithms. According to the method, the modulation mode used by the sending end is first determined based on the status of the data buffer of the relay, so that sent data does not exceed a storage capability of the relay. Then, based on data sent by the sending end, a status of a channel from the relay to the receiving end within a past period of time, and energy harvested within the past period of time, the relay determines, based on an offline algorithm, a modulation mode used within the past period of time, to obtain a higher total system throughput. After that, the modulation mode obtained based on the offline algorithm and the channel status information are used as training data to obtain a classification model according to the naive Bayes classifier algorithm. The relay can further adaptively select the modulation mode based on the classification model and channel status information in a current timeslot, and dynamically adjust a classification result based on an energy status, to finally obtain modulation modes used by the relay in all timeslots.

Compared with the prior art, the present disclosure has the following advantages:

1. The present disclosure considers a specific modulation mode of a node, and provides a modulation mode selection policy used under limited energy storage and data storage conditions. In this way, proper modulation modes can be selected for different bit error rate requirements of the receiving end, thereby increasing the total system throughput.

2. Through energy harvesting, the relay can adaptively select the proper modulation mode based on the existing classification module, without depending on system information in a subsequent timeslot. This better accords with an actual communications system model. In addition, the classification model does not dynamically change with the energy storage status and the channel status, thereby greatly reducing the loss resulting from maintenance performed by the relay on the classification model.

3. Stored energy is reasonably allocated, so that utilization of the energy harvested by the relay is improved. This avoids a waste of energy due to a poor channel status, and increases the total system throughput.

DETAILED DESCRIPTION

The following describes the present disclosure in more detail with reference to accompanying drawings and specific embodiments.

Figure 5:
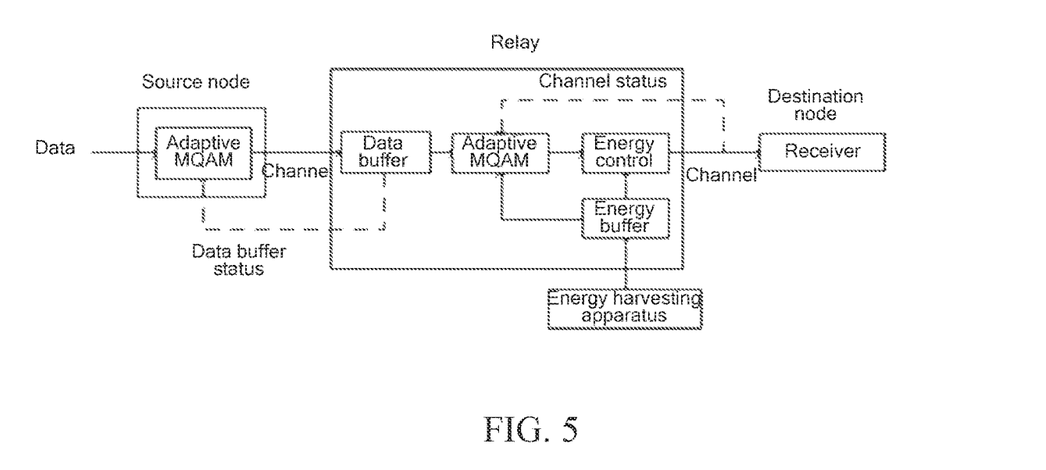
FIG. 5 is a schematic structural diagram of a system according to the present disclosure.

According to a method in the present disclosure, in a single-relay wireless communication scenario, each node sends a signal in an MQAM mode, and needs to adaptively determine a current modulation mode based on system information in a current timeslot through machine learning, to increase a system throughput. Refer to FIG. 5. Specifically, a sending end first determines its modulation mode based on a status of a data buffer of a relay, so that sent data does not exceed a storage capability of the relay. Then, based on data sent by the sending end, and channel status information and energy harvesting status information within a period of time, the relay determines an optimal modulation mode used by the relay within the period of time, to increase a total system throughput. After that, the modulation mode, the channel status information, and the energy harvesting status information are used as training data to obtain a classification model based on a naive Bayes classifier algorithm. In this way, the relay can adaptively select a modulation mode when only knowing of channel information and energy information in a current timeslot, to increase the total system throughput and energy utilization.

Figure 1:
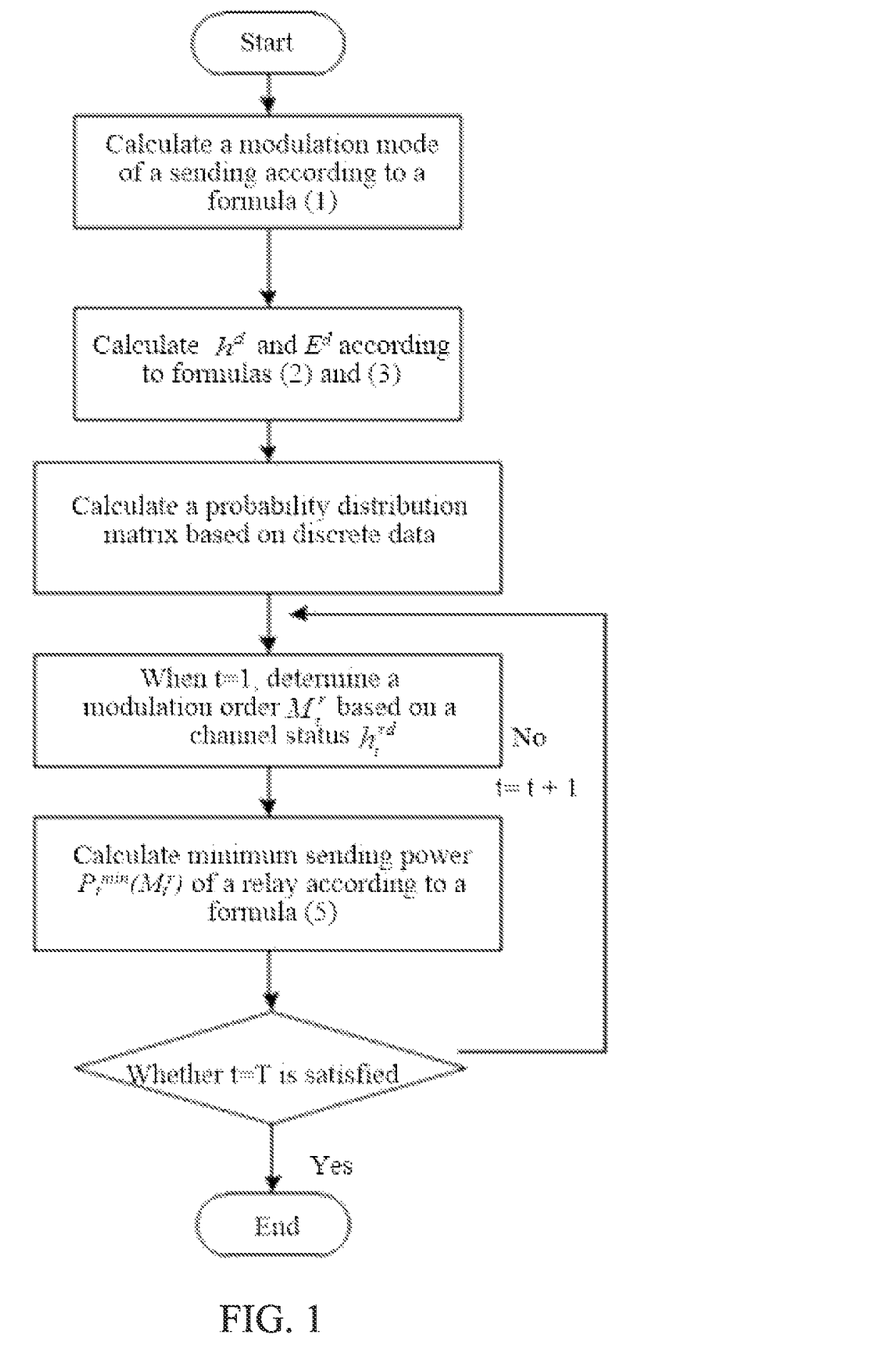
FIG. 1 is a schematic flowchart of a method according to the present disclosure.

Based on the foregoing design principle and working process, an embodiment provides an adaptive modulation method for a naive Bayes classifier-based energy harvesting relay system. As shown in FIG. 1, the method includes the following steps:

S1: Determine, based on a status of a data buffer of an energy harvesting relay, a modulation mode used by a sending end.

This step specifically includes determining a modulation mode $M_t^s$ in a timeslot t according to a formula (1), where a system includes the sending end S, a receiving end D, and the energy harvesting relay R, the relay contains the data buffer and an energy buffer, and a storage capacity of the data buffer in a timeslot t−1 is $Q_{t-1}$:

$$M_t^s \leq 2^{\frac{(Q_{max}-Q_{t-1})\tau}{\tau_s}} \quad (1)$$

In the foregoing formula, $Q_{max}$ represents a maximum storage capacity of the data buffer, $\tau$ represents a length of half a timeslot, $\tau_s$ represents a symbol sending cycle, and a value of $M_t^s$ belongs to a set $M=\{1, 4, 16, 64, 256\}$.

S2: Determine a modulation mode of the relay based on a probability distribution matrix.

This step specifically includes: obtaining a corresponding normalized channel gain $$k_t = \frac{h_t^{rd} - \overline{h_{rd}}}{\overline{h_{rd}}}$$

based on a gain $h_t^{rd}$ of a channel from the relay to a destination node in the timeslot t, where $\overline{h_{rd}}$ represents an average gain of the channel from the relay to the destination node; and discretizing the channel based on a value of $k_t$ to obtain a discretized channel status $h^d$, where the discretized channel status is classified into four levels, in other words, $h^d=1, 2, 3, 4$ and details are shown in the following expression (2):

$$h^d = \begin{cases} 1 & k_t < -0.25 \\ 2 & -0.25 < k_t < 0 \\ 3 & 0 < k_t < 0.25 \\ 4 & k_t > 0.25 \end{cases} \quad (2)$$

obtaining a discretized energy storage status based on an energy storage status $E_t^r$ in the timeslot t;

$$E^d = \left\lfloor 1 + \frac{1.5h_{rd}E_t^r}{\ln\left(\frac{1}{5BER}\right)N_0W\tau} \right\rfloor_M \quad (3)$$

calculating condition probabilities $P(h^d/M^r)$ and $P(E^d/M^r)$ for each modulation order $M^r=1, 4, 16, 64, 256$ based on the probability distribution matrix, and obtaining a posterior probability according to the following formula:

$$P(M^r/h^d \times E^d) = \frac{P(h^d/M^r)P(E^d/M^r)P(M^r)}{P(h^d \times E^d)}; \quad (4)$$

comparing, by the relay, posterior probabilities of different modulation orders, and selecting a modulation order with a maximum posterior probability as a modulation mode $M_t^r$ in the current timeslot.

S3: Determine a sending power of the relay.

In this embodiment, to make full use of energy, it is assumed that the relay uses minimum sending power to send data after determining the modulation mode. Therefore, the sending power of the relay is determined based on the modulation order:

$$P_t^{min}(M_t^r) = \frac{(M_t^r - 1)\ln\left(\frac{1}{5BER}\right)N_0W}{1.5h_{rd}} \quad (5)$$

In the foregoing formula, BER represents a bit error rate requirement of the receiving end, $M_t^r$ represents the modulation order of the modulation mode used by the relay, $N_0$ represents noise power, W represents received signal bandwidth, and $h_{rd}$ represents a status of a channel from the relay to a source node. Then, remaining energy $B_t$ of the relay is calculated based on energy harvested by the relay:

$$B_t = E_t - P_t^{min}(M_t^r) \quad (6)$$

In the foregoing formula, $E_t$ represents an initial energy status of the energy buffer in the timeslot t.

It is assumed that $$B_t < 0 \quad (7)$$

The selected modulation order is modified as follows:

$$M_t^r = M_{t\,max}^r \quad (8)$$

The determining of the probability distribution matrix in step S2 includes the following steps S2-1 to S2-5.

S2-1: The relay determines, in the time t based on the harvested energy, an adoptable maximum modulation order $$M^r_{t\,max} = \left\lfloor 1 + \frac{1.5 h_{rd} B_t}{\ln\left(\frac{1}{5BER}\right) N_0 W \tau} \right\rfloor_M$$

where $\lfloor x \rfloor_M$ represents selecting a maximum element not greater than x from a set M={1, 4, 16, 64, 256}; and calculates a total system throughput $$V = \sum_{t=1}^{T} \frac{\tau}{\tau_s} \log_2 M^r_{t\,max}$$

based on $M^r_t$, where T represents a total time length.

S2-2: Determine the sending power $P_t^{min}(M_{t\,max}^r)$ of the relay according to the formula (2), and determine the remaining energy $B_t$ of the relay according to the formula (3).

S2-3: Adjust the modulation mode in the t through machine learning. This step specifically includes the following steps A to D:

A) Randomly select $M_t^{r'}$ to satisfy $M_t^{r'} < M_t^r$. Additional energy that the relay can store is:

$$E_{st}(M_t^{r'}) = P_t^{min}(M_t^{r0}) - P_t^{min}(M_t^{r'}) \quad (11)$$

In other words, a new energy status is:

$$B_{t+1} = B_{t+1} + E_{st}(M_t^{r'}) \quad (12)$$

B) Obtain, based on the new storage energy status by using the method in step A), a maximum modulation order $M_{t1}^{r'}$ that can be used by the relay in a timeslot $t_1$ that satisfies $t_1 > t$, in other words, $$M_t^r = \begin{cases} M_t^r & t < t \\ M_t^{r'} & t \geq t \end{cases} \quad (13)$$

C) determining a new total system throughput V based on the new modulation order MI; and if V'>V, updating a modulation order in a timeslot $t_1$ to satisfy $M_t^r = M_t^{r'}$ otherwise, keeping the modulation order unchanged; and D) Repeat step A) to step C) till all selectable modulation orders in the timeslot $t_1$ are selected.

S2-4: Repeat the preceding steps till a proper modulation mode is selected for the relay in each timeslot within T.

S2-5: Obtain the discretized channel status $h^d$ and the discretized energy storage status $E^d$ according to the formulas (2) and (3), take statistics on different channel statuses and energy statuses under a same modulation mode, and calculate the condition probabilities $P(h^d/M^r)$ and $P(E^d/M^r)$ respectively corresponding to the channel status and the energy status. If $P(M^r)$ represents initial probability distribution of different modulation orders, the posterior probability is obtained as follows according to a Bayes formula:

$$P(M^r / h^d \times E^d) = \frac{P(h^d \times E^d / M^r) P(M^r)}{P(h^d \times E^d)} \quad (14)$$

Based on an assumption that attribute conditions are independent, a posterior probability formula can be rewritten into the following formula:

$$P(M^r / h^d \times E^d) = \frac{P(h^d / M^r) P(E^d / M^r) P(M^r)}{P(h^d \times E^d)} \quad (15)$$

For different modulation orders, denominators in the posterior probability formula are the same. Therefore, the posterior probability is determined only by the numerator $P(h^d/M^r)P(E^d/M^r)P(M^r)$ in the posterior probability formula. It is assumed that $P(M^r)$ is the same for all the modulation orders. The posterior probability is obtained only based on a product $P(h^d/M^r)P(E^d/M^r)$ of the condition probabilities, and a final probability distribution matrix is obtained by taking statistics on posterior probabilities of all the modulation orders.

Based on the foregoing specific method steps, the specific process of the method in the present disclosure may be summarized as follows: First, the modulation mode used by the sending end is determined based on the status of the data buffer of the relay. Then, based on data sent by the sending end, a status of a channel from the relay to the receiving end within a past period of time, and energy harvested within the past period of time, the relay determines, based on an offline algorithm, a modulation mode used within the past period of time. After that, the modulation mode obtained based on the offline algorithm and the channel status information are used as training data, and probability distribution matrices of energy storage statuses and channel statuses corresponding to different modulation modes are calculated according to a naive Bayes formula to obtain a classification model. The relay can further adaptively select a modulation mode based on the classification model, channel status information in a current timeslot, and energy storage status information in the current timeslot, and finally obtain modulation modes used by the relay in all timeslots.

In this embodiment, simulation experiments are performed to verify an actual effect of the method in the present disclosure. For details, refer to FIG. 2 to FIG. 4.

Figure 2:
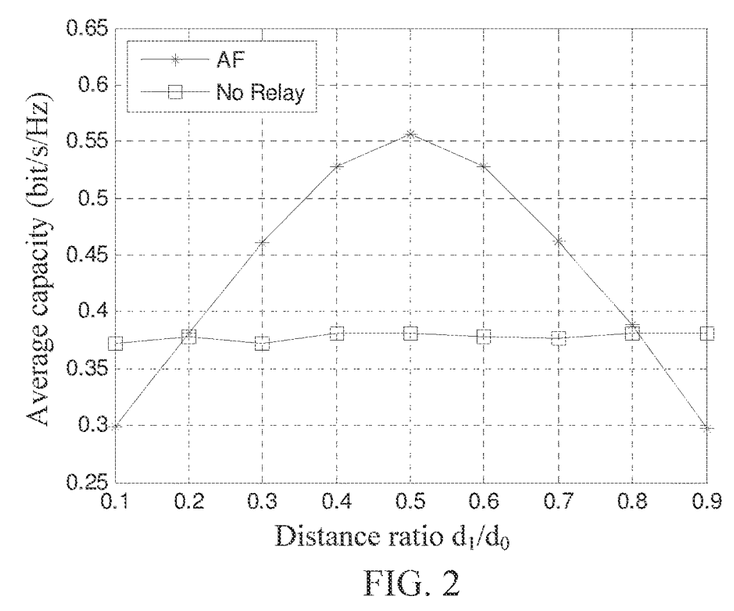
FIG. 2 compares system throughput changes before and after a relay is introduced to a wireless communications system.

FIG. 2 compares system throughput changes before and after a relay is introduced to a wireless communications system. It can be learned that, after the method in the present disclosure is applied and the relay is introduced, the system throughput is remarkably increased. For a user, especially a user within edge coverage of a base station, due to large-scale fading of a channel, sending power at a sending end is obviously attenuated. However, a relay technology can effectively improve coverage of the user. An originally faded signal can be enhanced through forwarding by the relay, so that strength of a signal at the receiving end maintains high. This increases a signal-to-noise ratio of the signal at the receiving end, thereby increasing the system throughput. When the relay is close to a midpoint between a sending end and the receiving end, channel fading can be improved best. When the relay is located at the sending end or the receiving end, the signal is basically not improved. Therefore, in FIG. 2, the system throughput first increases and then decreases with a position of the relay.

Figure 3:
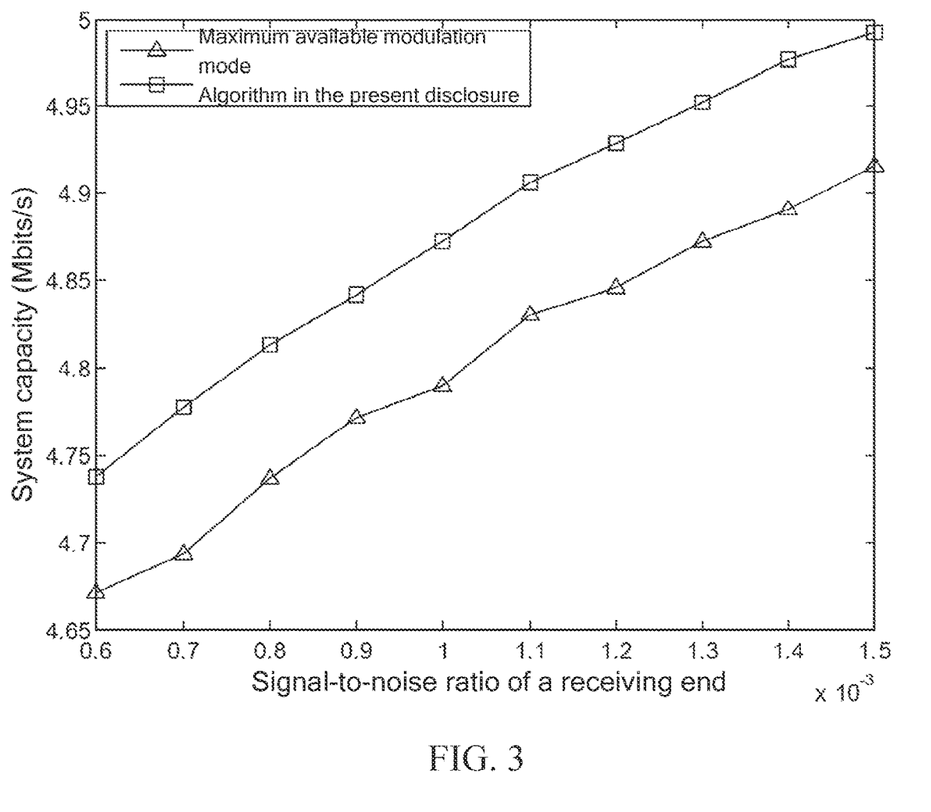
FIG. 3 compares changes of a total system throughput based on a bit error rate requirement of a user.

FIG. 3 compares a system throughput achieved based on an online adaptive modulation algorithm used in the present disclosure and a system throughput achieved based on an algorithm in which a relay directly uses a maximum modulation mode. Apparently, the system throughput is remarkably increased by adaptively adjusting a modulation mode of the relay. By adaptively adjusting the modulation mode of the relay, a proper modulation mode can be selected based on a channel status instead of only based on harvested energy. For example, a channel gain in a timeslot t is $h_t^{rd}$, and a channel gain in a timeslot $t_1$ is $h_{t_1}^{rd}$. It is assumed that energy harvested in the timeslot t is greater than that in the timeslot $t_1$, but the channel gain $h_t^{rd}$ is less than the channel gain $h_{t_1}^{rd}$. In this case, if the modulation mode is not adjusted, the relay will use the harvested energy as much as possible for the timeslot t, and as a result, obtains a relatively low system throughput due to a poor channel status. However, in the timeslot $t_1$, a relatively low system throughput is also obtained due to lack of energy. In the method of the present disclosure, the relay adjusts its modulation mode based on the channel status, and stores the energy to the timeslot $t_1$. In this way, a higher system throughput is obtained in the timeslot $t_1$ at the cost of discarding a part of a throughput in the timeslot t. Therefore, a total system throughput is increased. As a higher bit error rate requirement is imposed on the receiving end, the total system throughput is increased accordingly.

Figure 4:
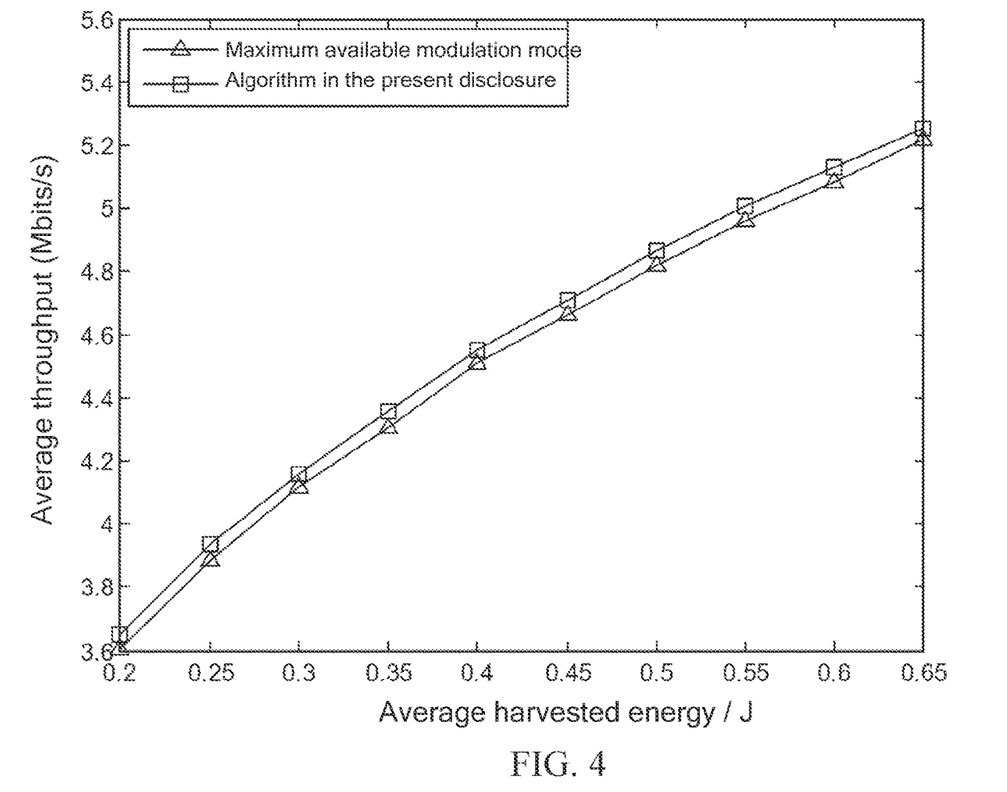
FIG. 4 compares changes of a total system throughput based on an energy reach rate.

FIG. 4 compares an average system throughput achieved based on an online adaptive modulation algorithm used in the present disclosure and an average system throughput achieved based on an algorithm in which a relay directly uses a maximum modulation mode. It can be learned that the average system throughput achieved according to the method of the present disclosure is greater than that achieved when the relay directly uses the maximum modulation mode, thereby remarkably increasing a total system throughput. In addition, in the online adaptive modulation algorithm, as an energy reach rate increases, a system capacity also increases accordingly, which is not realized in the algorithm in which the relay directly uses the maximum modulation mode.

The invention claimed is:

1. An adaptive modulation method for a naive Bayes classifier-based energy harvesting relay system, comprising the following steps:

S1: determining, based on a status of a data buffer of an energy harvesting relay, a modulation mode used by a sending end, comprising
determining a modulation mode $M_t^s$ of the sending end in a timeslot t according to $$M_t^s \leq 2^{\frac{(Q_{max} Q_{t-1})\tau_s}{\tau}},$$

wherein $Q_{MAX}$ is a maximum storage capacity of the data buffer of the energy harvesting relay, $\tau$ represents a length of half a timeslot and $\tau_s$ represents a symbol sending cycle; a system comprises the sending end S, a receiving end D, and the energy harvesting relay R, the relay contains the data buffer and an energy buffer, and a storage capacity of the data buffer in a timeslot t−1 is $Q_{t-1}$;

S2: determining a modulation mode of the relay based on a probability distribution matrix, comprising
obtaining a corresponding normalized channel gain $$k_t = \frac{h_t^{rd} - \overline{h_{rd}}}{\overline{h_{rd}}}$$

based on a gain $h_t^{rd}$ of a channel from the relay to a destination node in the timeslot t, wherein $\overline{h_{rd}}$ represents an average gain of the channel from the relay to the destination node; discretizing the channel based on a value of $k_t$ to obtain a discretized channel status $h^d$; obtaining a discretized energy storage status $$E^d = \left\lfloor 1 + \frac{1.5 h_{rd} E_t^r}{\ln\left(\frac{1}{5BER}\right) N_0 W \tau} \right\rfloor_M$$

based on an energy storage status $E_t^r$ in the timeslot t; calculating condition probabilities $P(h^d/M^r)$ and $P(E^d/M^r)$ for each modulation order based on the probability distribution matrix, and obtaining a posterior probability $$P(M^r/h^d \times E^d) = \frac{P(h^d/M^r)P(E^d/M^r)P(M^r)}{P(h^d \times E^d)};$$

and comparing, by the relay, posterior probabilities of different modulation orders, and selecting a modulation order with a maximum posterior probability as a modulation mode $M_t^r$ in a current timeslot; and S3: determining a sending power of the relay, comprising determining the sending power $$P_t^{min}(M_t^r) = \frac{(M_t^r - 1)\ln\left(\frac{1}{5BER}\right) N_0 W}{1.5 h_{rd}}$$

of the relay based on the modulation order, wherein BER represents a bit error rate requirement of the receiving end, $M_t^r$ represents the modulation order of the modulation mode used by the relay, $N_0$ represents noise power, W represents received signal bandwidth, and $h_{rd}$ represents a status of a channel from the relay to a source node; calculating remaining energy $B_t$ of the relay according to $B_t = E_t - P_t^{min}(M_t^r)$; and if $B_t < 0$, modifying the modulation order to satisfy $M_t^r = M_{t\ max}^r$, wherein $M_{t\ max}^r$ represents a maximum modulation order that can be selected in the current timeslot;

the determining of the probability distribution matrix in step S2 comprises the following steps:

S2-1: determining, by the relay in the timeslot t based on harvested energy, the adoptable maximum modulation order $$M_{t\ max}^r = \left\lfloor 1 + \frac{1.5 h_{rd} B_t}{\ln\left(\frac{1}{5BER}\right) N_0 W \tau} \right\rfloor_M$$

wherein $\lfloor x \rfloor_M$ represents selecting a maximum element not greater than x from a set M={1, 4, 16, 64, 256}; and calculating a total system throughput $$V = \sum_{t=1}^{T} \frac{\tau}{\tau_s} \log_2 M_{t\ max}^r$$

based on $M_t^r$, wherein T represents a total time length;

S2-2: determining the sending power $P_t^{min}(M_{t\ max}^r)$ of the relay based on the modulation order, and determining the remaining energy $B_t$ of the relay;

S2-3: adjusting the modulation mode in the timeslot t;

S2-4: repeating the preceding steps till a proper modulation mode is selected for the relay in each timeslot within T; and S2-5: obtaining the probability distribution matrix based on a naive Bayes classifier algorithm and the modulation order used by the relay, discretizing channel status information and energy storage status information that correspond to a timeslot in training data, taking statistics on different channel statuses and energy statuses under a same modulation mode, calculating the condition probabilities $P(h^d/M^r)$ and $P(E^d/M^r)$ respectively corresponding to the channel status and the energy status, obtaining the posterior probability $P(M^r/h^d \times E^d)$ according to a Bayes formula, and taking statistics on posterior probabilities of all modulation orders to obtain a finial probability distribution matrix.

2. The adaptive modulation method for a naive Bayes classifier-based energy harvesting relay system according to claim 1, wherein the adjusting the modulation mode in the timeslot t in step S2-3 specifically comprises the following steps:

A) randomly selecting $M_t^{r'}$ to satisfy $M_t^{r'} < M_t^r$, and calculating new sending power $P_t^{min}(M_t^{r'})$ of the relay to obtain new storage energy $B_{t_0+1}$;

B) obtaining, based on a new storage energy status by using the method in step A), a maximum modulation order $M_{t_1}^{r'}$ that can be used by the relay in a timeslot $t_1$ that satisfies $t_1 > t$;

C) determining a new total system throughput V' based on the new modulation order $M_{t_1}^{r'}$; and if V'>V, updating a modulation order in a timeslot t to satisfy $M_{t_0}^r = M_{t_0}^{r'}$; otherwise, keeping the modulation order unchanged; and D) repeating step A) to step C) till all selectable modulation orders in the timeslot $t_1$ are selected.

3. The adaptive modulation method for a naive Bayes classifier-based energy harvesting relay system according to claim 1, wherein $M^r$=1, 4, 16, 64, 256 in Step S2.

* * * * *